(12) United States Patent
Christensen (10) Patent No.: US 10,969,657 B2
(45) Date of Patent: Apr. 6, 2021

(54) SUPPORT STAND FOR PHOTOGRAPHY AND THE LIKE HAVING A PLURALITY OF ROTATABLE LEGS (71) Applicant: Savage Universal Corporation, Chandler, AZ (US)

(72) Inventor: Bo Christensen, Nordborg (DK)

(73) Assignee: Savage Universal Corporation, Chandler, AZ (US)

( * ) Notice: Subject to any disclaimer, the term of this patent is extended or adjusted under 35 U.S.C. 154(b) by 0 days.

(21) Appl. No.: 16/719,090

(22) Filed: Dec. 18, 2019

(65) Prior Publication Data
US 2020/0209715 A1 Jul. 2, 2020

Related U.S. Application Data (60) Provisional application No. 62/785,083, filed on Dec. 26, 2018.

(51) Int. Cl.
G03B 15/02 (2006.01)
F16M 11/38 (2006.01)
F16M 11/16 (2006.01)
F21V 21/22 (2006.01)

(52) U.S. Cl.
CPC ............ *G03B 15/02* (2013.01); *F16M 11/16* (2013.01); *F16M 11/38* (2013.01); *F21V 21/22* (2013.01); *F16M 2200/066* (2013.01); *F16M 2200/08* (2013.01)

(58) Field of Classification Search
None
See application file for complete search history.

(56) References Cited

U.S. PATENT DOCUMENTS

| 2,706,609 | A | * | 4/1955 | Sullivan | B65G 13/12 248/167 |
| 4,524,849 | A | * | 6/1985 | Riddle | E06C 1/20 182/170 |
| 4,541,597 | A | * | 9/1985 | Davanture | A47B 3/12 248/167 |
| 5,871,185 | A | * | 2/1999 | Phillips | F16M 11/16 248/165 |
| 6,007,259 | A | * | 12/1999 | Mori | F16M 11/28 248/168 |

(Continued)

*Primary Examiner* — William B Perkey
(74) *Attorney, Agent, or Firm* — Sutton Magidoff Barkume LLP (57) ABSTRACT There is provided a multi-leg stand, for photography and the like comprising a vertical main tube, a supporting structure for the vertical main tube comprising a plurality of legs connected to the bottom portion of said vertical main tube and including a plurality of lockable collars rotatably secured around the outer circumference of the vertical main tube and a leg rigidly secured to each of the lockable collars; each leg extends horizontally outwardly from one of the collars and including an outer end portion extending downwardly. At least one of the downwardly extending end portions, comprises a secondary tubular member having an opening at each end designed to securely hold a replaceable member; the replaceable member extends downwardly from the lower end opening thus providing further support for the stand. The stand can thus support either multiple lights or a combination of lights and reflectors or other elements.

6 Claims, 9 Drawing Sheets

(56) References Cited

U.S. PATENT DOCUMENTS

| | | | |
|---|---|---|---|
| 6,679,388 B1* | 1/2004 | Chiu | B62H 3/12 |
| | | | 211/22 |
| 6,688,565 B1* | 2/2004 | Chen | F16M 11/16 |
| | | | 248/166 |
| 2002/0088907 A1* | 7/2002 | Phillips | F16M 11/16 |
| | | | 248/157 |
| 2016/0342073 A1* | 11/2016 | Myers | F16M 13/00 |
| 2020/0209715 A1* | 7/2020 | Christensen | F21V 21/26 |

* cited by examiner

SUPPORT STAND FOR PHOTOGRAPHY AND THE LIKE HAVING A PLURALITY OF ROTATABLE LEGS

FIELD OF THE INVENTION

The present invention relates to a stand for use in photography or the like, often referred to as a "C-stand", having a plurality of rotatable legs to support, in a stable manner, photographic equipment or the like. The plurality of legs can be moved between a position where they are all parallel to one another extending substantially perpendicularly from the support to a variety of angular relationships one to the other. The improved stand further provides for a secondary support position which also can provide for an enhanced stability when the stand is placed on uneven ground or, e.g., on stairs.

BACKGROUND OF THE INVENTION

These C-stands, also known as Rocky Mountain stands, are well known in the art as having a plurality, usually at least three, of angularly spaced legs supporting a vertical main tube or column. The three or more legs can, in most such stands, be folded together so that they are all extending parallel from the main tube for ready storage. There is normally provided a locking element that locks the legs into the storage position described above or locks the legs into angularly spaced relationships to each other, around the main tube, to form a stable support.

Many examples of such C-stands can be found with a Google search and are available from a plurality of manufacturers, and sold under the trade names Matthews, Avenger, American, and Rock Solid Master. Such devices are also shown on the following patents: U.S. Pat. Nos. 6,688,565; 9,805,631; and US published application 2003/0029066.

SUMMARY OF THE INVENTION

The C-stand of the present invention includes all of the advantages of prior C stands but also provides a better solution to the stability of the stand on stairs as well as the capability of supporting two or more separate accessory devices, or of maintaining a single device in a more advantageous location relative to the outspread support legs. The legs are preferably all rotatably secured to the bottom of the main tube, but also are provided with locking means to hold the legs in various positions angularly related to each other. The individual legs are preferably vertically aligned along the bottom of the main tube so as to be locked and held either in a parallel position to each other so as to all extend outwardly on the same side of the main tube, or in several angular relationships to each other, in actual use. At least one of the legs, preferably the lowest and the shortest leg, has a secondary tube support extending perpendicularly upwardly and downwardly from the end of that leg. Although generally not required, it is also preferred to provide at least one other leg with a tertiary tube support extending perpendicularly from its end.

In a preferred embodiment the legs can be locked in place in the closed and in the open, angularly related positions by a spring-loaded plunger which prevents rotation of the legs relative to each other.

The main tube preferably includes telescoping tube units and a lighter weight vertical extension rod, at the end, that would be held in place by one or more screw clamps as shown in the drawings. Multiple extensions can be provided extending vertically, but the upper ones in a preferred improvement over the prior art can be made of, for example, carbon fiber and polymer to reduce unnecessary weight at the top. At the top or along the length of the extension rods can be provided clamps, for example, a so-called GOBO clamp.

The secondary support tube located at the end of one of the legs, preferably the lowest leg, can be open at the top and the bottom. The upper opening can accommodate from the top an extension tube permitting the supporting of, e.g., a second camera or a second lighting means, as preferred; and the bottom facing opening from the secondary tube can accommodate a foot, of different lengths, which can be used to stabilize the C-stand on hilly terrain or on stairs, or on a flat floor.

BRIEF DESCRIPTION OF THE DRAWINGS

Preferred examples of the present invention, to best achieve the above described results, are exemplified by the following listed drawings and the subsequent detailed description thereof.

DETAILED DESCRIPTION OF THE INVENTION

Figure 1:
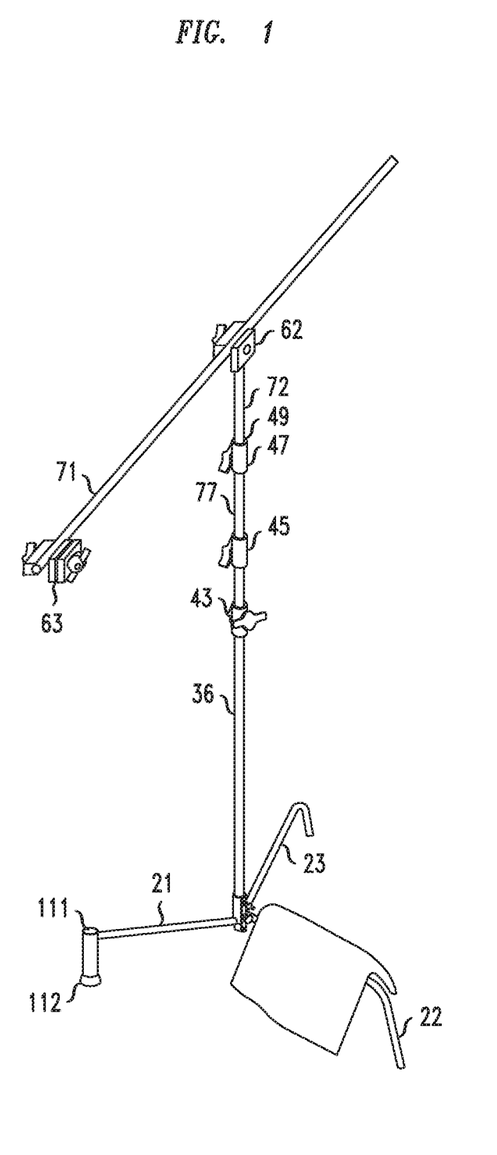
FIG. 1 is a preferred example of a tripod support wherein a GOBO clamp at the top of the stand supports a rod having at one of its ends a clamp for holding, for example, a photography light.
Figure 2:
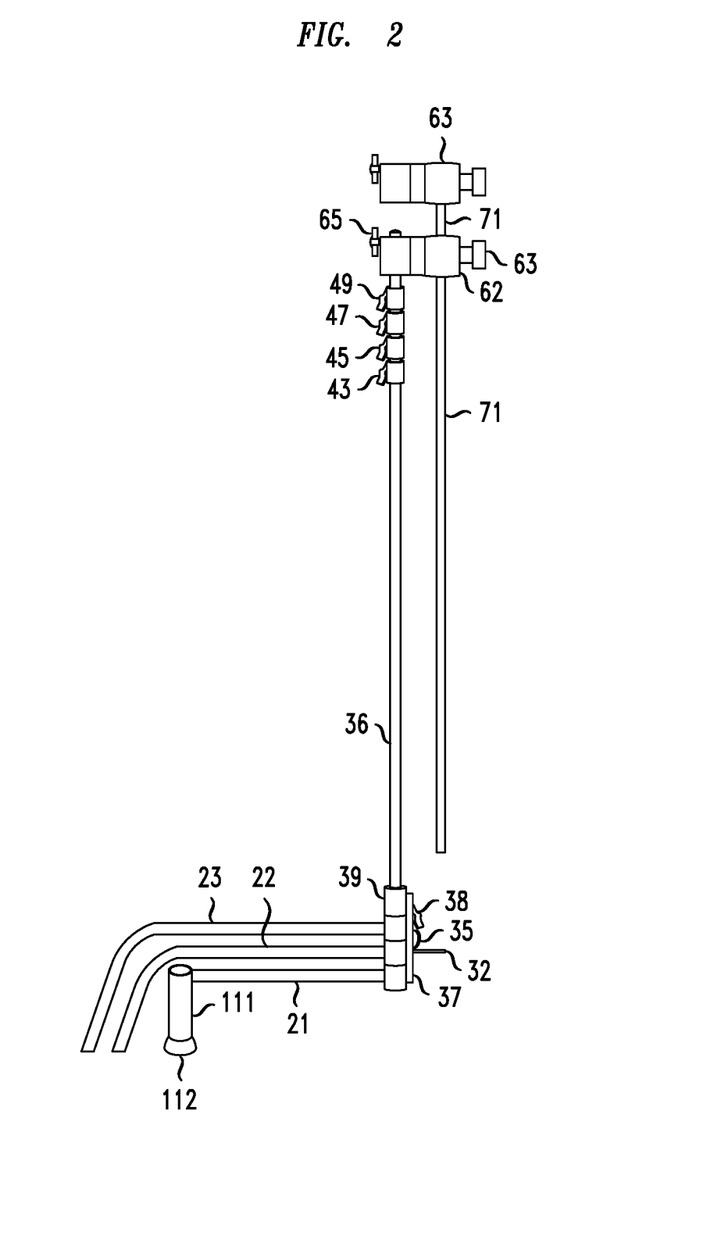
FIG. 2 is a drawing of the tripod stand of FIG. 1 in the storage position where all of the legs are parallel to each other and all extend towards one side of the vertical support stand where the vertical extensions have all been telescoped into the largest one.

Referring to the drawings, FIG. 1 shows the improved C-stand of the present invention, in open operational mode including some of the possible accessories. FIG. 2 shows the same improved C-stand of FIG. 1 but in the closed mode prepared for storage but including the same accessories as in FIG. 1, namely a pair of GOBO clamps 63 and an extension rod 71.

Figure 3:
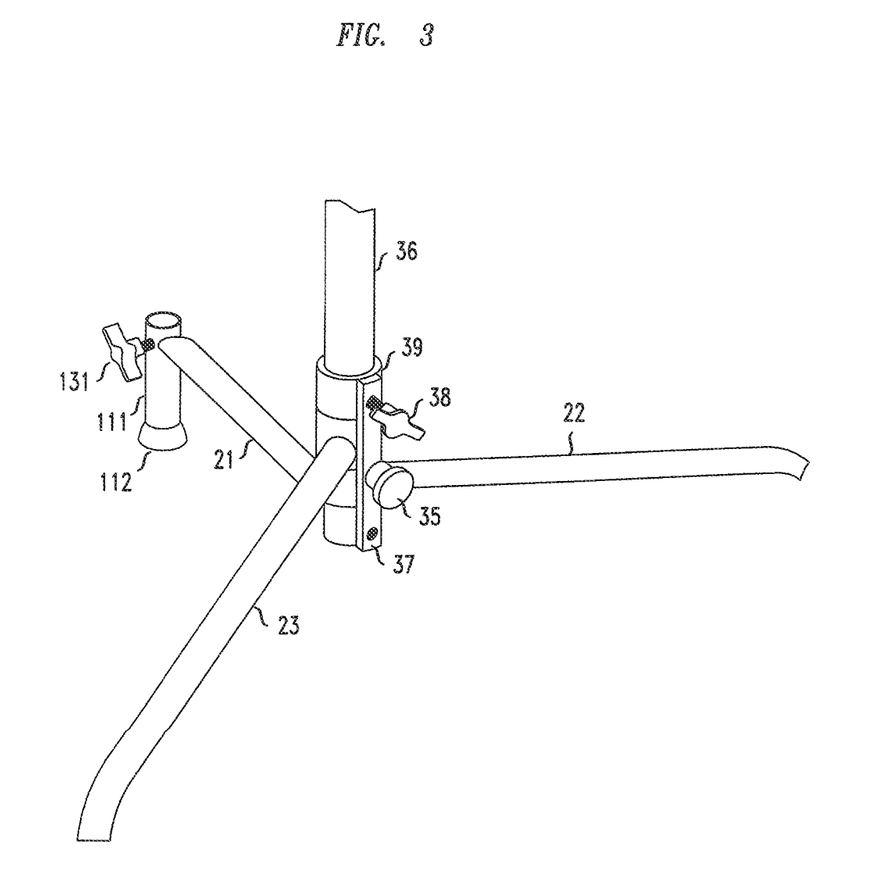
FIG. 3 is a close-up of the lower end of the tripod stand showing the three legs in the locked support position where they are equally angularly separated from each other and showing the secondary main tube at the end of the lowest leg.
Figure 4:
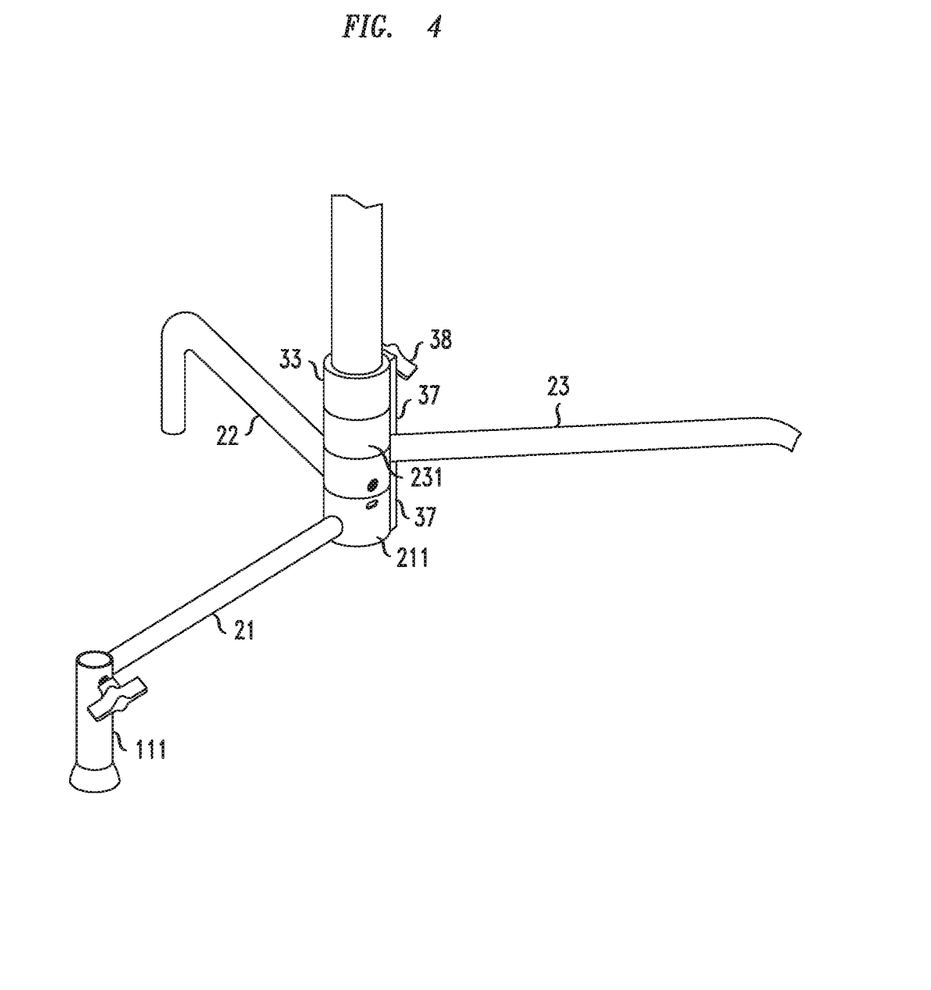
FIG. 4 is a further drawing of the stand in FIG. 3, viewed from the lower leg having the secondary tube foot.

FIGS. 3 and 4 display the basic support stand of the present invention in an enlarged view and from two different points of view. As shown, a central main tube 36 is supported by the three legs 21, 22, 23, which are each attached to a ring surrounding and rotatable about the central tube 36. A screw clamp 39 having a handle 38 when tightened prevents relative movement of the legs and the bottom of the main tube 36. A spring-loaded plunger extending through the bar 37 and pressing against the rings connected to the legs, permits the legs to rotate to different angular relationships when the knob 35 is pulled out. In the angular relationship shown in FIGS. 3 and 4, the legs are equiangularly separated, i.e., being 120° apart. It is also possible to lock the two legs 22 and 23 into a greater angular separation up to 180°.

The lowest leg 21 is connected to a transversely extending foot 120, which has openings at the top and bottom for the insertion of various accessories. In FIGS. 3 and 4, the lowest leg 21 is supported by a rubber bottom tip 112, extending from the bottom opening. When the spring plunger 35 is pulled out the three legs are permitted to rotate about the central tube 36 to different desired relative angular positions.

Figure 5A:
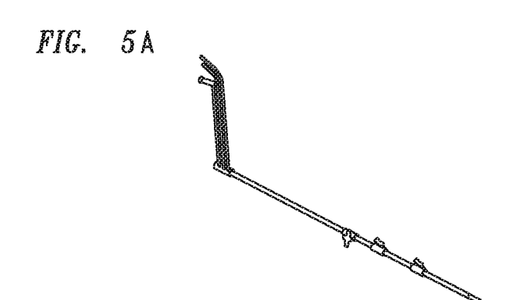
FIGS. 5A-C and 6A-C are drawings showing the method of folding the legs into the storage position and into one of the operational supporting position described above.
Figure 5B:
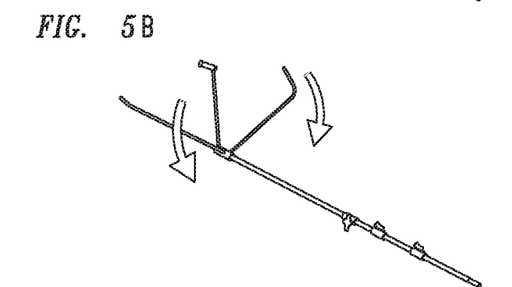
Figure 5C:
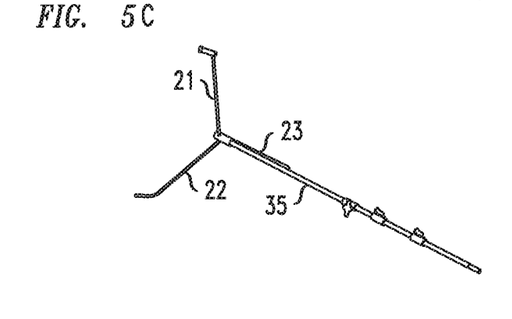
Figures 6A, 6B:
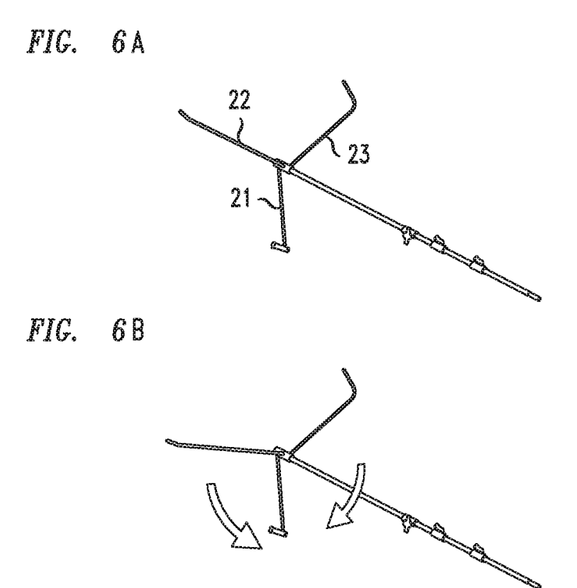
Figure 6C:
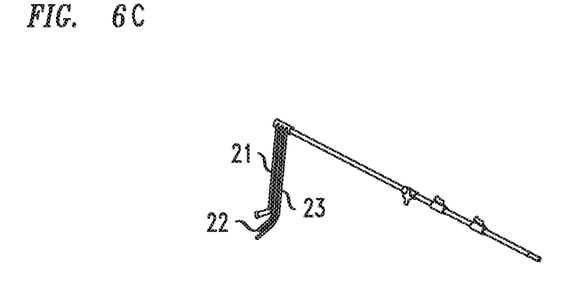

FIGS. 5 and 6 depict the steps in moving the system of the present invention between the closed storage position (FIGS. 5A,6C) and open, operational position (FIGS. 5C,6A).

Figure 7:
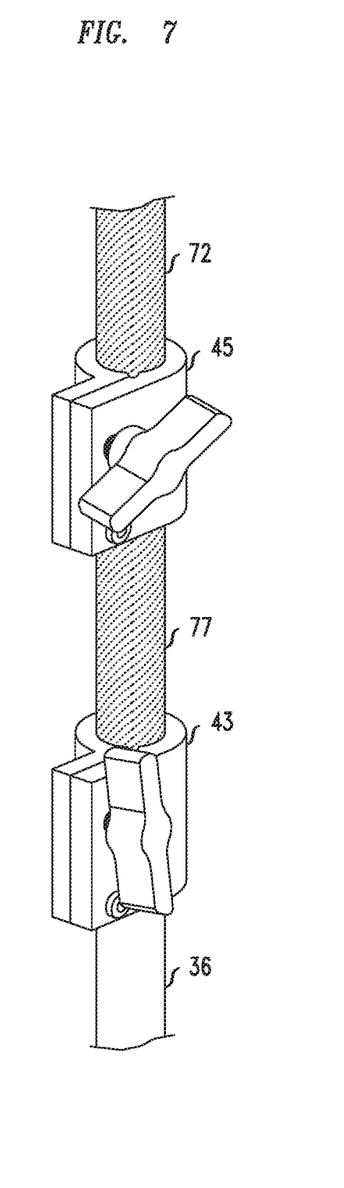
FIG. 7 is a close-up of a telescoping carbon fiber riser tube extending upwardly from a steel base and the clamps which provide for locking the riser into a desired position and for providing the initial support for the rod and GOBO clamp for holding desired photographic equipment.

FIG. 7 depicts two telescopically extendable rod risers 72, 77, extending outwardly from the main standing tube 36 in a telescopic manner; the risers 72,77 are preferably made from a lightweight material, such as carbon fiber, having the necessary strength in compression but which may be more brittle than stainless steel; such lightweight material provide the advantages however of an overall weight reduction without loss of compressive or tensile strength. The riser tubes are preferably held in place by the wraparound clamping riser collars 45, 47, which are useful as they apply even pressure against the carbon tubes, which may be shattered by a point contact screw due to their greater brittleness then steel.

Figure 8:
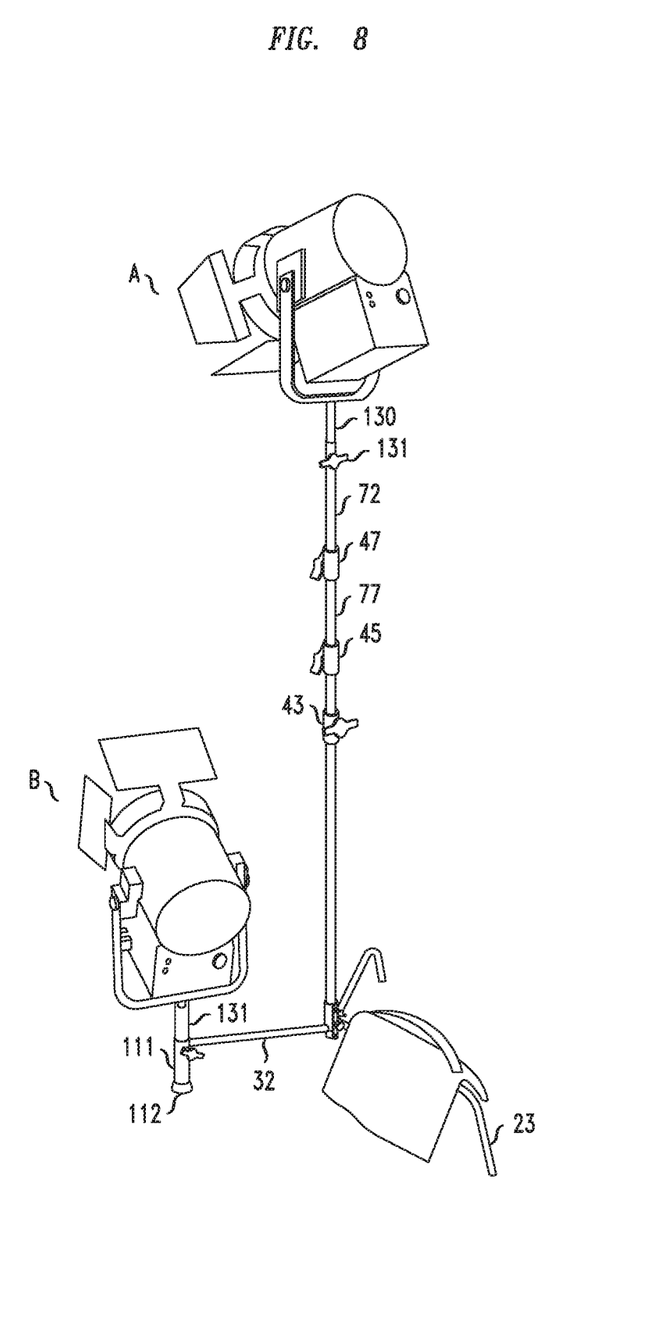
FIG. 8 shows an example of the tripod stand of FIG. 1 in an upwardly extended position holding a photography light at the top of the main support stand and a second photography light at the top of the secondary support tube, allowing the secondary lamp to be lower to the desired location.

FIG. 8 displays a pair of accessory lighting fixtures A, B; one attached to the end of the riser tube 130 by a harness having a narrow tube extending into the risers at the top clamp 131, and the second from the upper portion of the secondary riser support tube 111, again with a clamping means 131.

Figure 9:
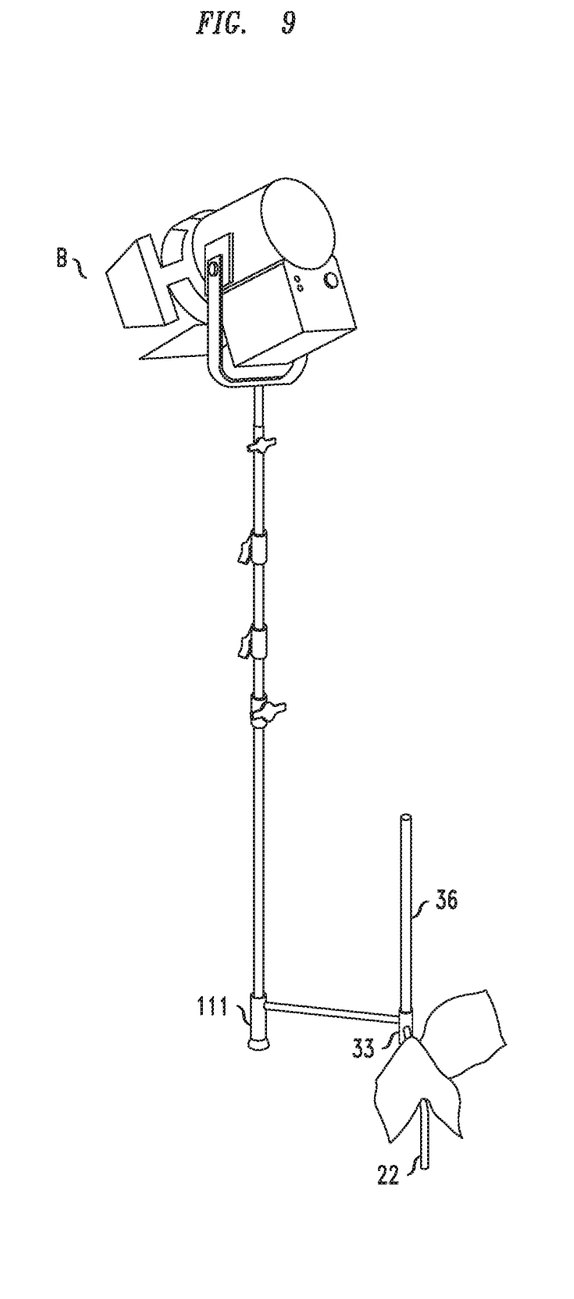
FIG. 9 is a drawing showing the stand of FIG. 3 where the main support extends from the secondary tube support to be more closely adjacent a device to be photographed or filmed without being impeded by the length of the leg.

FIG. 9 displays the use of the C-stand of this invention, with an accessory lamp supported from the junior riser support tube 111, shown as standing against a supporting wall to prevent its falling over based on the weight of the lamp fixture at the top.

If the fixture is on a narrow shelf or on a stair tread having a narrow depth, it is shown that the upper two legs 22,23 can be extended outwardly so as to be more than 120 angular distance part and therefore able to fit upon a narrower tread.

Figure 10:
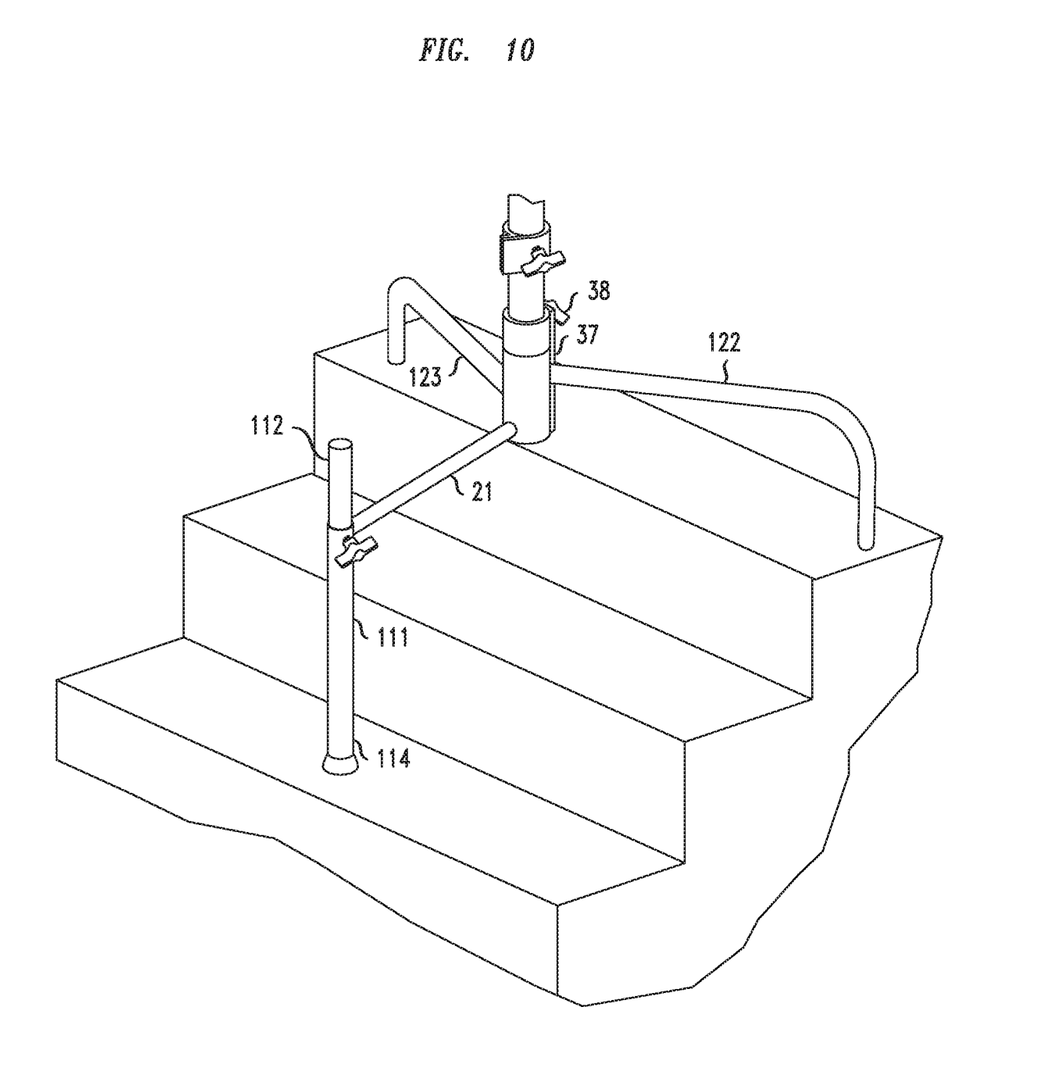
FIG. 10 shows the tripod support of FIG. 3 wherein the lowest leg includes a short upwardly extending rod from the junior support and a downwardly extending long support foot useful for supporting the stand on stairs in a safer manner.

FIG. 10 displays the system of the present invention on a stairway where the secondary riser tube 111 is supported on a lower stair tread by a leg extension 114, capable of reaching a lower step tread. As stated above, if the stair treads are narrower, the two other legs 22 and 23 can be more widely separated, up to 180° apart, to fit on the shallow tread. The present invention can therefore be safely used in situations that would be unsafe for the conventional C-stand tripod.

Similarly, the number of legs in the present invention is not limited to three but can be increased, e.g., to 4 legs, if required or desirable, which would result in smaller angular separations between at least two adjacent legs.

The present invention has been herein described with examples of preferred embodiments and it is understood that many changes and modifications in the described embodiments can be made without departing from the scope and the spirit of the invention as defined by the claims herewith.

What is claimed is:

1. A multi-leg stand, comprising:
    a vertical main tube;
    a supporting structure comprising a plurality of legs connected to the bottom portion of said vertical main tube and including a plurality of lockable collars secured around the outer circumference of the vertical main tube and a leg rigidly secured to each of the lockable collars; each leg extending horizontally outwardly from one of the collars and including an outer end portion extending downwardly;
    at least one of the downwardly extending end portions having comprising a secondary tubular member having an opening at each end designed to securely hold a replaceable member; the replaceable member extending downwardly from the lower end opening intended to serve as the contact with the ground.

2. The multi-leg stand of claim 1, further comprising:
    vertical extension tubes lockably extending from the upper portion of the vertical main tube.

3. The multi-leg stand of claim 1, further comprising:
    a set of connecting elements mounted along the vertical extension tubes for connecting a lighting fixture or a photographic apparatus to a portion of said main tube.

4. The multi-leg stand of claim 1, further comprising:
    a telescopically extendable foot extending from the lower opening of the secondary tubular member to permit use on stairs or uneven ground.

5. The multi-leg stand of claim 1, further comprising extending upwardly from the upper end opening of the secondary tubular member a replaceable member capable of holding a photographic unit or accessory distal from the vertical main tube.

6. The multi-leg stand of claim 1, further comprising:
    a telescoping riser extending upwardly from the upper end opening of the secondary tubular member, for holding a photographic accessory.

\* \* \* \* \*